A. MAROSCHEK.
TIRE ARMOR.
APPLICATION FILED DEC. 2, 1913.
1,122,017.
Patented Dec. 22, 1914.
2 SHEETS—SHEET 1.
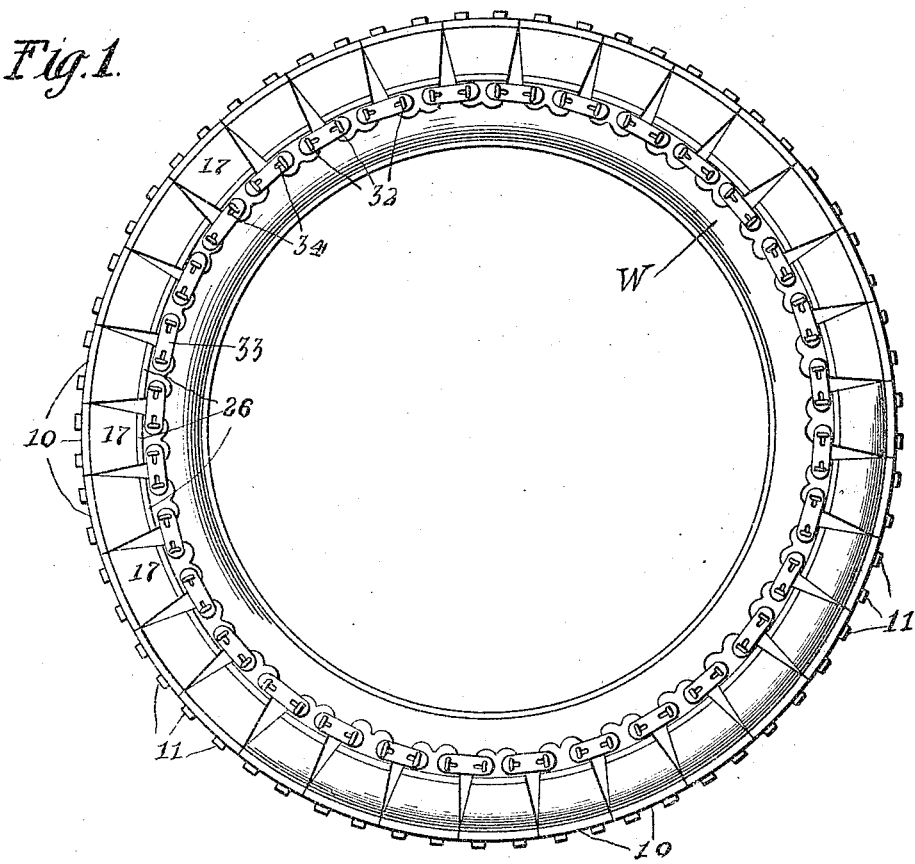
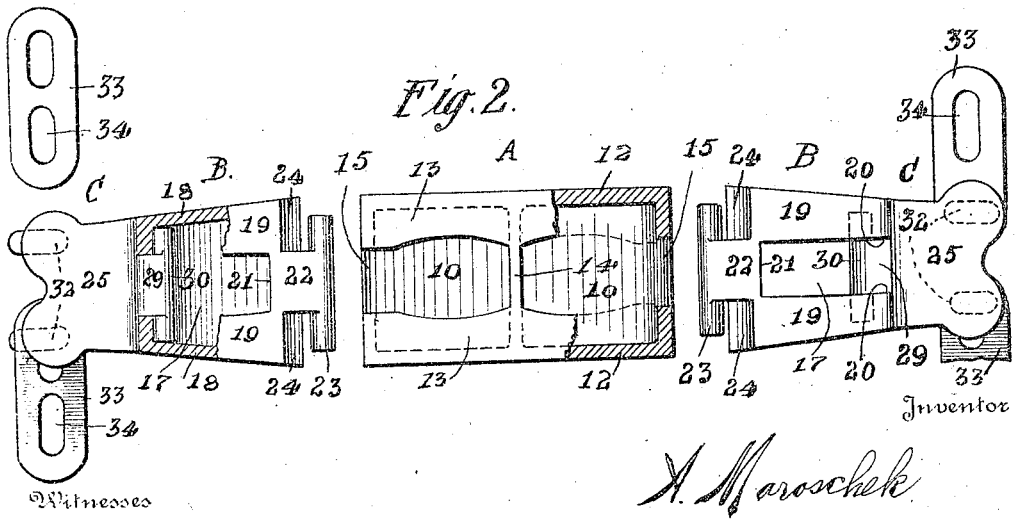

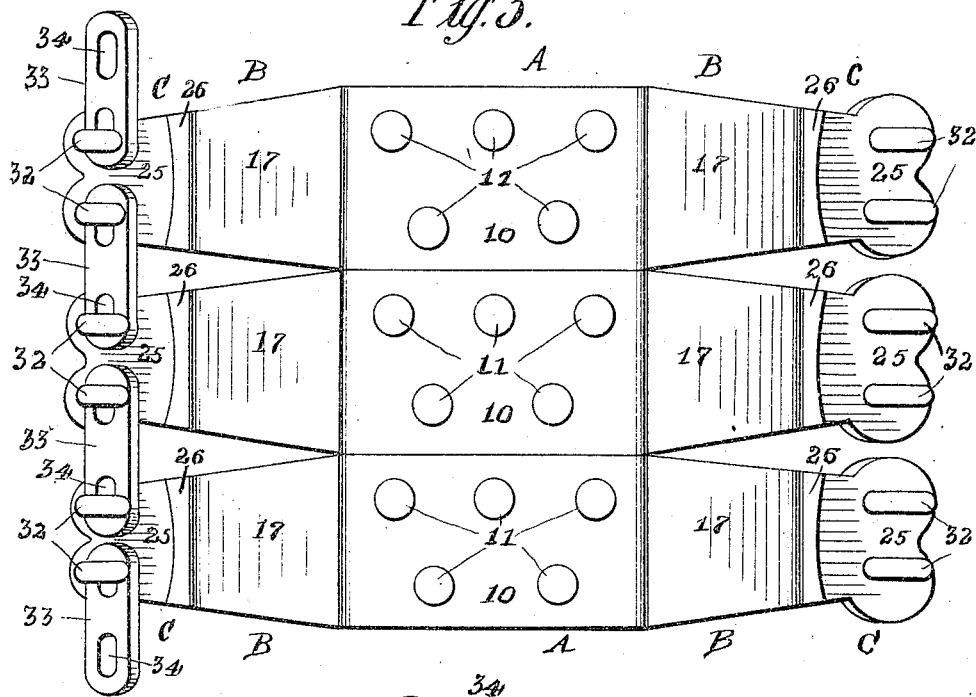
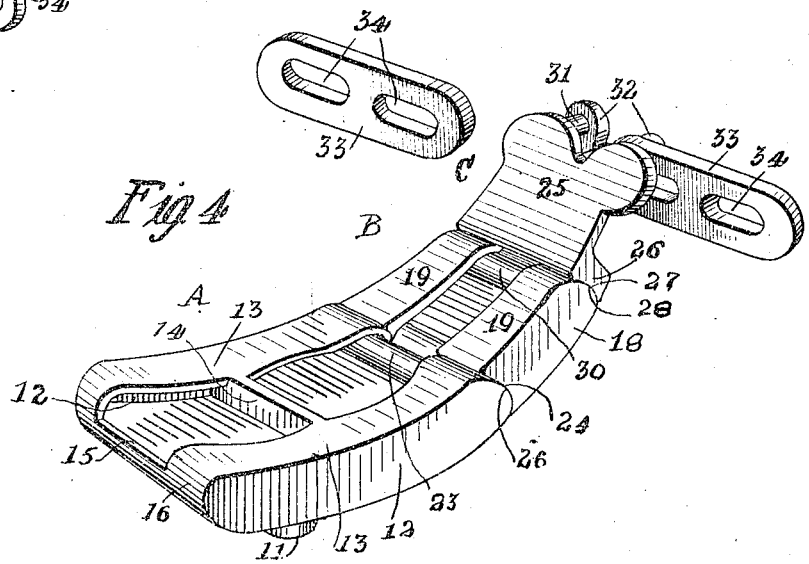

UNITED STATES PATENT OFFICE.

ANDREW MAROSCHEK, OF PLAINFIELD, NEW JERSEY.

TIRE-ARMOR.

1,122,017.  Specification of Letters Patent.  Patented Dec. 22, 1914.

Application filed December 2, 1913. Serial No. 804,143.

*To all whom it may concern:*

Be it known that I, ANDREW MAROSCHEK, a subject of the Emperor of Austria-Hungary, residing at Plainfield, in the county of Union and State of New Jersey, have invented certain new and useful Improvements in Tire-Armor, of which the following is a specification.

This invention relates to certain new and useful improvements in tire armor.

An object of the invention is to provide the outer face of the tire shoe with anti-skidding devices comprising independent sections which preferably cover the whole outer surface of the tire.

A further object of the invention is to provide a tire armor formed of sections and in which the several sections are formed of interlocking parts or units so that any one of the units or a whole section may be readily removed should the same become worn or injured and replaced with a new part or section.

With the above and other objects in view which will appear as the nature of the invention is better understood, the same consists in the novel construction and arrangement of parts to be hereinafter more fully described and then claimed, reference being had to the accompanying drawings by like characters throughout the several views, and wherein:

Figure 1 is a side elevational view of a wheel with my tire armor attached. Fig. 2 is a bottom plan view of one of my armor sections with some of the parts constituting the same detached. Fig. 3 is a top plan view of three of my armor sections, and Fig. 4 is an inverted perspective view of a portion of one of my armor sections.

Referring more specifically to the drawings, the reference letter W designates a wheel of usual construction, but preferably a wheel having a pneumatic tire to which my tire armor is attached. As shown in Fig. 1 the armor sections completely inclose the tread surface of the tire and injury thereto is practically impossible.

My tire armor is formed of independent sections which are suitably connected together at their outer ends to provide a compact but yieldable structure. Each of the sections comprises the units designated in general A, B and C.

The central unit A is disposed centrally of the tread of the tire and is of suitable curvature to engage said tire throughout its entire length. The same is true of the intermediate units B and end units C when the several units are connected. The central section A comprises the outer wall 10 provided on its outer face with the projections or pins 11 and provided with depending side walls 12. The side walls 12 carry inwardly directed flanges 13 which are parallel with the outer wall 10 and terminate a distance spaced from the center line thereof. A transverse partition 14 separates the central unit into two compartments. Each end of the central unit is provided with the cut away portion 15 for purposes to be hereinafter described. The ends of the unit A are suitably convexed or rounded as at 16.

The unit B is in construction somewhat similar to the section A and comprises the outer wall 17 provided with the side walls 18 which carry the inwardly directed flanges 19. These flanges 19 terminate at a point corresponding to the flanges 13. One end of the unit B is cut away as at 20 while the other end of said unit is closed as at 21, which end carries a projection 22 provided with a T-head 23. The end of the unit B which carries the T-head is provided with a concaved seat 24 upon both sides of the projection 22 to adapt the same to snugly engage the convexed end 16 of the unit A.

The unit C forms the outer extremity of each section and comprises the plate 25 having the enlarged inner end 26 suitably curved as at 27 to snugly engage the outer curved end 28 of the unit B. An extension or projection 29 is carried by the inner end of the unit C and is provided on its end with a T-head 30. The outer face of the unit C is provided with a pair of studs 31 carrying enlarged elongated heads 32. For assembling the sections as shown in Fig. 3, links 33 are provided and each link has a pair of alined elongated openings 34 to receive the studs 31.

In assembling the several units forming each section, the unit B has its T-head 3 placed in longitudinal alinement with the opening between the flanges of the unit A. The T-head 23 is then lowered into the opening and turned at right angles thereto and moved outwardly toward the end 16 when the contacting ends 16 and 24 will engage and present a substantially continuous surface. The unit C is then interlocked with the unit B in a similar manner after which the links 33 are applied as above described.

While I have shown and described the preferred embodiment of my invention, I do not wish to confine myself thereto, as various modifications and arrangement of the parts as shown may be had without departing from the spirit and scope of the invention as claimed.

I claim:—

1. An armor for tires, comprising a plurality of sections each consisting of a central unit embodying an outer plate having inwardly-extending side walls connected by slotted end-plates, intermediate units each formed at its inner end with a T-shaped head, said heads being adapted to be inserted lengthwise into the spaces between said side walls and then turned to a position transverse to the periphery of the tire to interlock said intermediate units to the central unit yieldingly, and end units yieldingly connected at their inner ends to said intermediate units and provided at their outer ends with outwardly-projecting studs, and means engaging the studs of adjacent sections for connecting the sections together.

2. An armor for tires, comprising a plurality of sections each consisting of a central unit, intermediate units and end units curved to conform to the contour of the tire, said central unit having an outer plate provided with inwardly-extending side walls and connecting end plates, the latter being formed with openings, and each of said intermediate units having a T-shaped projection at one end adapted for insertion between the side walls of the central unit and for engagement with said end plates, and also having curved surfaces conforming to complementary curved surfaces on the central unit, end units connected yieldingly at their inner ends to said intermediate sections and provided at their outer ends with outwardly - projecting studs, in combination with slotted links engaging the studs of adjacent sections to couple the sections together upon the tire.

In testimony whereof I affix my signature in presence of two witnesses.

ANDREW MAROSCHEK.

Witnesses:
WENZEL F. RYSHOVY,
HENRY HAURANO.